Sept. 15, 1964 P. PIGANIOL 3,149,079
METHOD FOR PRODUCING VISIBLE LIGHT FROM ULTRAVIOLET LIGHT
Filed Sept. 15, 1961
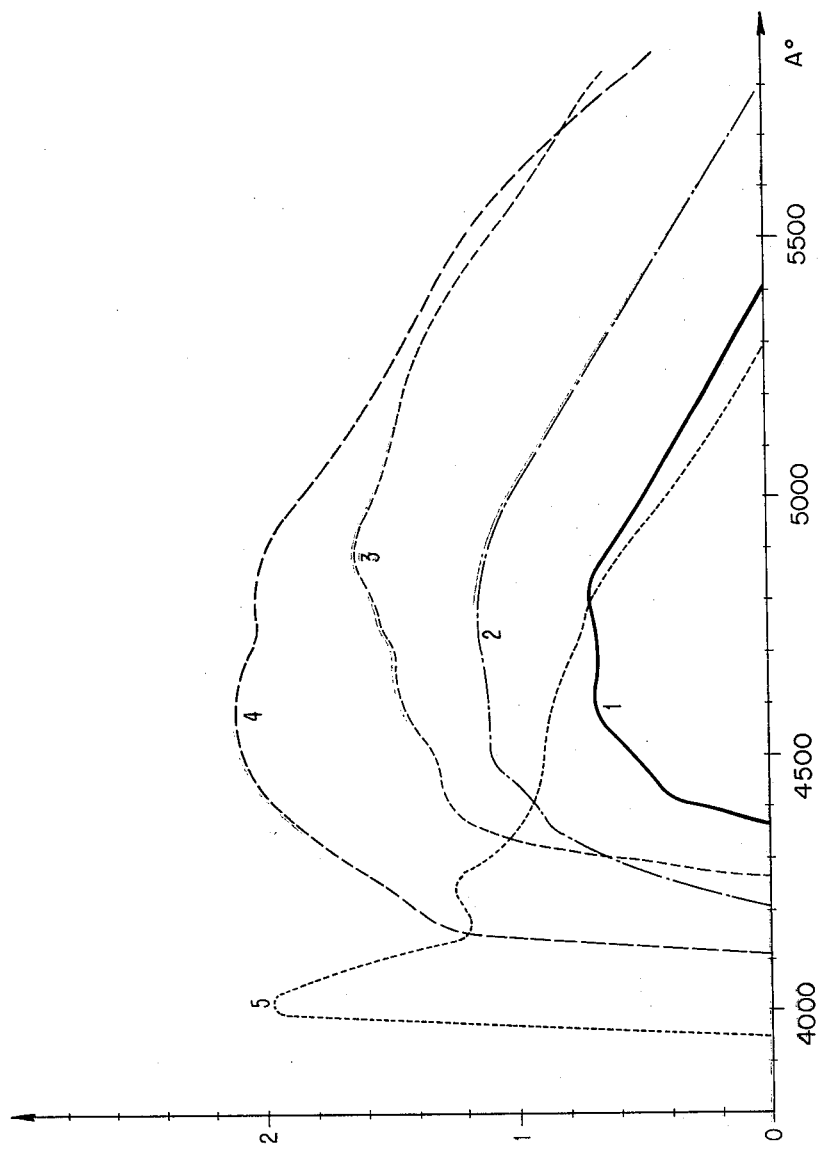
INVENTOR.
PIERRE PIGANIOL
BY *Bauer and Seymour*
ATTORNEYS

United States Patent Office 3,149,079
Patented Sept. 15, 1964

3,149,079
METHOD FOR PRODUCING VISIBLE LIGHT
FROM ULTRAVIOLET LIGHT
Pierre Piganiol, Paris, France, assignor to Compagnie de Saint-Gobain, Neuilly-sur-Seine, France
Filed Sept. 15, 1961, Ser. No. 157,288
Claims priority, application France Sept. 20, 1960
7 Claims. (Cl. 252—301.2)

This invention relates to the transformation of light of one wave length to light of a different wave length by means of a physical transformer. This phenomenon is generally known under the name of luminescence. The invention is particularly useful in transforming ultraviolet light to visible colors and it will be described in that use. An exceptionally efficient range of transformation will serve as the basis of specific examples.

When luminescent substances are to be used in industry it is customary to use mineral substances such as the sulfides of zinc or cadmium, the phosphates of barium or strontium or the halophosphates of calcium, for example, or certain general crystalline, organic substances such as anthracene and its derivatives, the aromatic aldehydes and ketones, certain benzoic or phthalic esters, some carbazols, acridine dyes such as acridine orange and trypaflavine, all of which have appreciable luminescence. In addition certain natural organic compositions such as proteins like serumalbumine offer substantial degrees of luminescence but are industrially useless from their very nature. The only really useful compositions for industrial application are solid products of the kind listed above but their use presupposes their mixture with inert, non-luminescent substances in order to obtain cohesion and mechanical strength.

It is an object of the invention to make a new class of organic, resinous, luminescent transformers having good mechanical properties and efficient powers of transformation. Another and particular object is to transform ultraviolet light to visible light of different hues and to make novel, luminescent, resinous compositions of matter having different powers of transformation. Another object is to prepare novel high polymers of maleimide and its N-substituted derivatives of organic substituents and to improve such compositions by copolymerization with unsaturated polymerizable monomers. A further object is to prepare shaped articles such as films, filaments, and solid bodies for industrial use as wave length transformers. The articles themselves constitute a major object of the invention both as polymers and copolymers.

The objects are accomplished, generally speaking, by making luminescent transformers having the formula

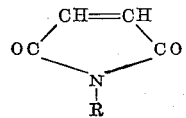

by the polymerization of appropriate monomers, and to improve them physically and in efficiency by copolymerization with monomers having no recognized powers of transformation.

The derivatives of maleimide which form the basis of manufacture of luminescent polymers and copolymers include unsubstituted maleimide and maleimide in which the nitrogen atom has as a substituent alkyl groups of which methyl, ethyl, isopropyl, isobutyl, isoamyl, octyl and lauryl are exemplary, or aryl or alkylaryl groups of which phenyl, and benzyl are exemplary, or carbamyl —$CONH_2$.

The unsaturated monomers which may be advantageously used for the preparation of luminescent copolymers of maleimide and its N-substituted derivatives are notably vinyl compositions of which vinyl acetate, styrene, are exemplary, or acrylic compositions of which acrylic nitrile, and methyl methacrylate are exemplary, and other compatible monomers such as isopropenyl acetate. In general, for satisfactory results, the content of the maleimide derivatives in the copolymer should be above 10% and preferably between 30 and 50%. High contents of up to 100% can be usefully employed but are not usually necessary to obtain satisfactory results.

The advantage of the copolymers with respect to the luminescent polymers alone is that the copolymers are easier to work and to put into use. These resulting products are plastic materials easy to shape by the action of heat and pressure and/or they are substances which are soluble in the usual organic solvents such as acetone, tetrahydrofurane, dimethylformamide, for example, solutions which can be used to prepare film or fibers. Additionally, the polymers and luminescent copolymers have excellent electrical insulating properties as well as good heat resistance which enables them to be used at relatively high temperatures and to be employed in the manufacture of luminescent articles in the electrical industry.

The quantity of unsaturated substances which are non-luminescent, which can be introduced into the copolymer with the luminescent high polymer without reducing the luminescence of the resulting product too much, should be such that interrupted sequences are produced containing several maleimide groups in the copolymer chain. Experience shows that this corresponds practically to contents of maleimide in the copolymer which vary according to the non-luminescent part of the copolymer, being not less than 10 to 15% and being particularly advantageous in proportions of maleimide (and its N-substituted derivatives) on the order of 30 to 50% of the copolymer.

The luminescence, that it to say the power of converting ultraviolet light to visible light is especially high for that range of the spectrum between 4000 to 6000 A. at room temperature.

The drawing is a diagram showing the conversion characteristic of different polymers using an ultraviolet light of 3650 A. On this graph the abscissa indicates the wave length in A. of the visible light and the ordinate represents the logarithm of the intensity of the visible light. Curve 1 is for unsubstituted polymaleimide. Curve 2 relates to polyethylmaleimide. Curve 3 relates to polymethylmaleimide. Curve 4 relates to polyisoamylmaleimide. Curve 5 relates to polyisobutylmaleimide. The curves indicate the influence of the substituent on nitrogen not only on that which concerns the spectral region in which is situated the maximum intensity, but also the maximum value of this intensity itself, which is greatest for polyisoamylmaleimide and weakest for polymaleimide itself. It is thus observable that the polymers substituted on N show a surprising increase in efficiency of transformation from ultraviolet light to visible light.

For the observer the color and intensity of emitted light obtained by excitation with ultraviolet light varies according to the nature of the groups substituted on N, as is indicated in Table 1 hereinafter which relates to powder samples of the different polymers. In these tests the powder samples were excited by a mercury vapor lamp filtered to supply radiation of 2537 A.

TABLE 1

| Polymers | Luminescence | |
|---|---|---|
| | Intensity | Color |
| Polymaleimide | Weak | Green. |
| Polymethylmaleimide | Strong | Strong Green. |
| Polyethylmaleimide | Medium | Blue green. |
| Polyisobutylmaleimide | do | Blue. |
| Polyisoamylmaleimide | Strong | Do. |
| Polyphenylmaleimide | Medium | Yellow. |

A difference of intensity and color are observed for different copolymers in a powder state when excited by radiation of 2537 A. These copolymers have been prepared in mixtures of equal parts of unsubstituted maleimide and other unsaturated polymerizable substances. This is indicated in Table 2.

TABLE 2

| Copolymers | Luminescence | |
|---|---|---|
| | Intensity | Color |
| Maleimide-vinyl acetate | Strong | Green-blue. |
| Maleimide-styrene | Medium | Do. |
| Maleimide-acrylic nitrile | Strong | Blue. |
| Maleimide-methyl methacrylate | Medium | Blue-green. |
| Maleimide-isopropenyl acetate | Strong | Green. |

The following examples illustrate the invention without limitation on the generalities elsewhere herein stated:

*Example 1*

Eight grams of powdered copolymer of isoamylmaleimide and isopropenyl acetate (50–50 by weight) were placed in an open mold of rectangular shape and compressed under vacuum high enough to degas the powder, first at room temperature and then at about 150° C. During the high temperature phase the pressure was 1 metric ton/mm.$^2$ applied for several minutes.

The mold was cooled, the pressure released, and the mold was opened. A rigid, translucent plate 50 x 50 x 3 mm., of light amber color was produced. This plate was excited by Wood's light (3650 A.) and gave off a green, uniform luminescence.

*Example 2*

In the cold, or more rapidly on the water bath, a solution of 1 part of a resin made by copolymerizing 50 parts by weight of maleic imide and 50 parts of isopropenyl acetate was made in 1.5 parts by weight of tetrahydrofurane and 1.5 parts by weight of dimethylformamide.

This solution was brushed onto a glass plate as a varnish and the solvents evaporated. The coating was colorless, brilliant, transparent and 3/100 mm. thick. It was hard and adhered tenaciously to the glass. When illuminated by ultraviolet light it gave off a green luminescent light.

*Example 3*

Using the method of Example 2, one part by weight of a resin made by copolymerizing maleic imide and vinyl acetate (50–50) was dissolved in 1.5 parts by weight of tetrahydrofurane and 1.5 parts by weight of dimethylformamide. The solution is applied on a sheet of translucent paper. The solvent was evaporated completely. There was thus produced on one face of the paper a brilliant film, 2 to 3/100 mm. thick, strongly adherent to the paper. Observed in Wood's light this paper thus varnished had a beautiful green-blue luminescence.

*Example 4*

A solution of one part of polyisoamylmaleimide in 2.5 parts (by weight) of methylisobutylketone was made. This solution was applied to a glass plate; the film obtained was transparent, slightly yellow, hard and tenacious. In ultraviolet light it gave off blue luminescence.

*Example 5*

A solution of one part of a resin obtained by copolymerizing equal weights of isoamylmaleimide and isopropenyl acetate in 2.5 parts by weight of methylisobutylketone was made. This solution was deposited on a glass plate and the solvent was air evaporated. The film obtained was hard and tenacious but slightly fragile. When activated by Wood's light it gave off a strong, beautiful, green light.

This invention provides homogeneous, self-sustaining, resinous bodies which are themselves excellent transformers of ultra violet light, and it is unnecessary to interpose any other medium to evoke the phenomenon. These polymers and copolymers appear as white powders and may be molded into colorless or slightly yellow transparent objects. In this case, they should have molecular weights of at least 10,000 and preferably of more than 50,000. They may also be dissolved in ordinary organic solvents to yield, after evaporation of the solvent, a coherent, luminescent pellicle which is activated by ultra violet light and gives off pleasing light in visual regions. Their molecular weight needs then to be no more than 2,000.

I have discovered that these high polymers and copolymers have a very accentuated luminescene of which the intensity is even higher than that of the monomers from which they are derived, and of which the hue varies according to the nature of the groups substituted on nitrogen. In the case of the copolymers the tint also varies according to the nature and the quantity of the unsaturated monomer which is introduced into the chain.

It was an astonishing discovery that the efficiency of the polymers as transformers of ultra violet light can be increased by the choice of a substituent which is attached to the nitrogen of the imide.

Although only a limited number of embodiments of the invention are described in detail in the foregoing specification, it is to be expressly understood that the invention is not limited thereto. Various other changes which will now be apparent to those skilled in the art may also be made without departing from the spirit and scope of the invention.

What is claimed is:

1. The method of transforming ultra violet light to a visible wave length in the range from yellow to blue which comprises irradiating a high polymer of at least one compound of the formula

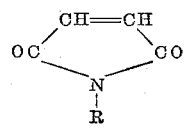

in which R is one of a group consisting of H, alkyl, aryl, aralkyl, and carbamyl, with ultra violet light.

2. The method of claim 1 in which R is H.
3. The method of claim 1 in which R is alkyl.
4. The method of claim 1 in which R is aryl.
5. The method of claim 1 in which R is aralkyl.
6. The method of claim 1 in which R is carbamyl.
7. The method of claim 1 in which the compound

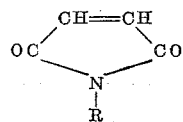

is a copolymer with a member of the class consisting of polymerizable vinyl monomers, polymerizable acrylic monomers and isopropenyl acetate.

References Cited in the file of this patent

UNITED STATES PATENTS

| | | |
|---|---|---|
| 2,301,356 | Arnold et al. | Nov. 10, 1942 |
| 2,650,215 | Strain | Aug. 25, 1953 |
| 2,669,555 | Giammaria | Feb. 16, 1954 |
| 2,708,663 | Downing et al. | May 17, 1955 |
| 2,743,260 | Tawney | Apr. 24, 1956 |
| 2,751,372 | Taylor et al. | June 19, 1956 |
| 2,790,787 | Tawney | Apr. 30, 1957 |